(12) United States Patent
Smith et al.

(10) Patent No.: US 9,605,732 B2
(45) Date of Patent: Mar. 28, 2017

(54) EXPANDING PISTON HYDRAULIC CHAIN TENSIONER

(71) Applicant: BorgWarner Inc., Auburn Hills, MI (US)

(72) Inventors: Dale N. Smith, Freeville, NY (US); Mark Wigsten, Lansing, NY (US)

(73) Assignee: BORGWARNER, INC., Auburn Hills, MI (US)

( * ) Notice: Subject to any disclaimer, the term of this patent is extended or adjusted under 35 U.S.C. 154(b) by 0 days.

(21) Appl. No.: 14/903,860

(22) PCT Filed: Jul. 7, 2014

(86) PCT No.: PCT/US2014/045547
§ 371 (c)(1),
(2) Date: Jan. 8, 2016

(87) PCT Pub. No.: WO2015/006195
PCT Pub. Date: Jan. 15, 2015

(65) Prior Publication Data
US 2016/0369874 A1    Dec. 22, 2016

Related U.S. Application Data

(60) Provisional application No. 61/844,552, filed on Jul. 10, 2013.

(51) Int. Cl.
*F16H 7/08* (2006.01)
*F16H 7/22* (2006.01)
(52) U.S. Cl.
CPC ... *F16H 7/0848* (2013.01); *F16H 2007/0812* (2013.01); *F16H 2007/0859* (2013.01)
(58) Field of Classification Search
CPC .. F16H 7/0848; F16H 7/12; F16H 2007/0848; F16H 2007/0812;
(Continued)

(56) References Cited

U.S. PATENT DOCUMENTS 5,601,505 A     2/1997   Tada
5,700,213 A *  12/1997   Simpson ............... F16H 7/0848
                                                         474/110
(Continued)

FOREIGN PATENT DOCUMENTS

EP      0 837 264 A2    4/1998
JP      S 55-63451 U    4/1980
(Continued)

OTHER PUBLICATIONS

International Search Report for PCT/US2014/045547 with mailing date of Nov. 6, 2014.
(Continued)

*Primary Examiner* — William E Dondero
*Assistant Examiner* — Robert T Reese
(74) *Attorney, Agent, or Firm* — Howard & Howard Attorneys PLLC

(57) ABSTRACT

A tensioner (10) for an endless loop power transmission member can include the assembly of a plunger (12) operably engageable with an endless loop power transmission member, and a piston (14) guiding the plunger (12) for sliding coaxial movement in a direction of the endless loop power transmission member and defining an oil reservoir (26) for receiving hydraulic fluid. A bearing (28) can have bearing balls (30) located in a counter bore (32) coaxial with piston bore (34). The counter bore (32) can have a steep taper (36) on which the bearing balls (30) ride, such that as the plunger (12) moves in an extending direction, the bearing balls (30) move out of the counter bore (32) allowing free extending movement of the plunger (12), and as the plunger (12) moves in a retracting direction, the bearing balls (30) are driven down into the steep taper (36) preventing the plunger (12) from retracting.

15 Claims, 1 Drawing Sheet

(58) Field of Classification Search
CPC ..... F16H 2007/0859; F16H 2007/0855; F16H 2007/0806
See application file for complete search history.

(56) References Cited

U.S. PATENT DOCUMENTS

| | | |
|---|---|---|
| 5,704,860 A | 1/1998 | Stief |
| 5,993,342 A | 11/1999 | Wigsten et al. |
| 2009/0247336 A1 | 10/2009 | Bongard et al. |

FOREIGN PATENT DOCUMENTS

| | | |
|---|---|---|
| JP | S 58-18147 U | 2/1983 |
| JP | H 10-061737 A | 3/1998 |
| JP | 2002139110 A | 5/2002 |
| JP | 2008-303974 A | 12/2008 |

OTHER PUBLICATIONS

English language abstract and machine-assisted English translation for JPH 10-061737 extracted from PAJ database on Nov. 30, 2016, 10 pages.

English language abstract and machine-assisted English translation for JP 2008-303974 extracted from espacenet.com database on Nov. 30, 2016, 16 pages.

English language abstract and machine-assisted English translation for JPS 55-63451 extracted from espacenet.com database on Jan. 2, 2017, 5 pages.

English language abstract and machine-assisted English translation for JPS 58-18147 extracted from espacenet.com database on Jan. 2, 2017, 3 pages.

\* cited by examiner

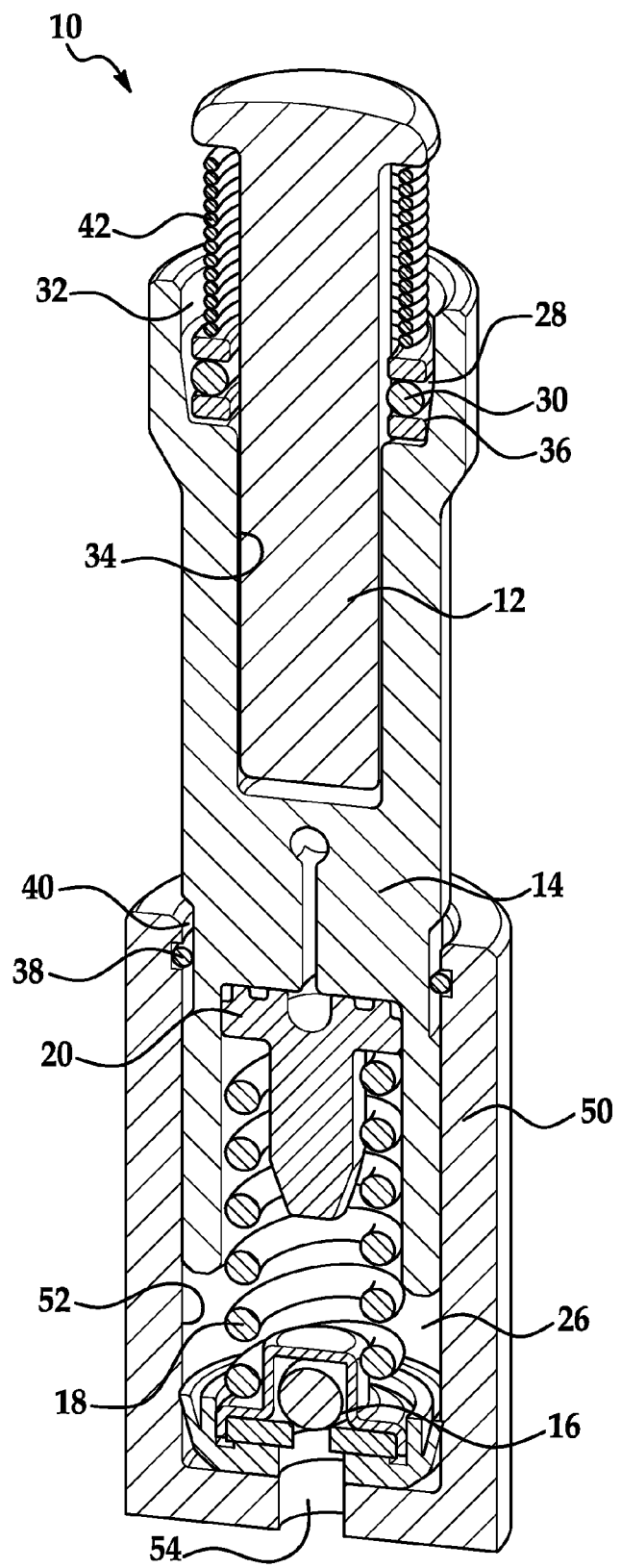

EXPANDING PISTON HYDRAULIC CHAIN TENSIONER

FIELD OF THE INVENTION

The invention relates to a tensioner, and more particularly to an endless loop power transmission member tensioner as used in endless loop power transmission drives of internal combustion engines for tensioning the endless loop power transmission member during operation.

BACKGROUND

Timing drive tensioners are designed to control timing drive dynamic inputs transmitted through the chain and ultimately the tensioner arm/face. In order to achieve this control, tensioners are 'tuned' via mechanical, hydraulic or a combination of both methods. As the chain wears, a typical tensioner piston extends as designed to take up chain slack. Piston extension reduces mechanical bias spring force and can increase hydraulic leakage changing the tensioner tuning. This change in tuning during the life cycle of the tensioner can be compensated for by over-tensioning the tensioner when the tensioner is new to compensate for piston extension during the worn chain portion of the life cycle. Over-tensioning of the tensioner has an adverse effect on efficiency and system durability.

A necessary function of a tensioner is to extend to take up chain slack as the chain wears. In a conventional tensioner, chain take up increases compression spring length reducing chain preload requiring excessive preload at new chain conditions to compensate, which adversely effects efficiency and system durability.

SUMMARY

A tensioner for an endless loop power transmission member can include the assembly of a plunger operably engageable with an endless loop power transmission member, and a piston guiding the plunger for sliding coaxial movement in a direction of the endless loop power transmission member and defining an oil reservoir for receiving hydraulic fluid. A bearing can have bearing balls located in a counter bore coaxial with piston bore. The counter bore can have a steep taper on which the bearing balls ride, such that as the plunger moves in an extending direction, the bearing balls move out of the counter bore allowing free extending movement of the plunger, and as the plunger moves in a retracting direction, the bearing balls are driven down into the steep taper preventing the plunger from retracting.

The tensioner can include two springs, a first spring serving to bias the plunger away from the piston and a second spring serving to bias the piston away from the cylinder bore. The tensioner can be designed such that the assembled load of the piston bias spring is always greater than the assembled load of the plunger bias spring. The piston, cylinder, reservoir, check valve, and vent can act as a conventional hydraulic tensioner providing spring force, force from oil pressure, and hydraulic damping to the endless loop power transmission.

The travel of the piston relative to the cylinder can be limited to a distance that is smaller than the total travel required by the tensioner for complete take-up of system wear. A cylinder can have a bore for guiding the piston for sliding coaxial movement in a direction of the endless loop power transmission member and defining an oil reservoir for receiving hydraulic fluid there between. A circular clip can be retained within a groove in an inside diameter (ID) of the cylinder. The piston can have a groove of given width on the piston in which the circular clip rides. The given width corresponding to a distance at least equal to the minimum required backlash of the tensioner. An end wall of the groove can come into contact with the circular clip during extending movement, such that the when the piston has fully extended relative to the piston bore, the spring force from the first spring no longer reacts against the chain, but the second spring can push the plunger outward relative to the bearing and piston. The short travel hydraulic portion of the tensioner is thereby re-positioned outward as the system wears.

The disclosed tensioner makes use of a short travel hydraulic tensioner arranged in series with a zero pitch/zero backlash ratchet mechanism. A typical chain tensioner will use a hydraulic tensioner in parallel with a ratchet. This tensioner has the hydraulic function riding along on top of the ratchet. The travel of the hydraulic parts can be much lower than the overall travel of the tensioner needs to be, so the design of the spring between the piston and cylinder is easier. The benefit is that the load can be more consistent. Also, the length of the hydraulic leak path never changes. With a typical tensioner, the farther the tensioner moves out the shorter the leak path becomes. This tensioner provides a configuration where the two springs are designed so that the zero backlash ratchet will never extend while the hydraulic part of the tensioner is compressed.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a cross sectional view of an expanding piston hydraulic chain tensioner.

DETAILED DESCRIPTION

A tensioner 10 for an endless loop power transmission member can include an assembly of a plunger 12 operably engageable with an endless loop power transmission member, and a piston 14 guiding the plunger 12 for sliding coaxial movement in a direction of the endless loop power transmission member. The piston 14 partially defining an oil reservoir 26 for receiving hydraulic fluid. A bearing 28 can have bearing balls 30 located in a counter bore 32 coaxial with piston bore 34. The counter bore 32 can have a steep taper 36 on which the bearing balls 30 ride, such that as the plunger 12 moves in an extending direction, the bearing balls 30 move out of the counter bore 32 allowing free extending movement of the plunger 12, and as the plunger 12 moves in a retracting direction, the bearing balls 30 are driven down into the steep taper 36 preventing the plunger 12 from retracting. A cylinder 50 can have a bore 52 for guiding the piston 14 for sliding coaxial movement in a direction of the endless loop power transmission member and defining an oil reservoir 26 for receiving hydraulic fluid therebetween. A circular clip 38 can be retained within a groove in an inside diameter (ID) of the cylinder. The piston 14 can have a groove 40 of given width on the piston 14 in which the circular clip 38 rides. The given width can correspond to an allowable backlash for the tensioner. An end wall of the groove 40 can come into contact with the circular clip 38 during extending movement, such that the circular clip 38 stops the piston 14 with the circular clip 38. A bias spring 42 can act between the bearing 28 and plunger 12. The bias spring 42 can serve to bias the plunger 12 out of the piston 14 when the circular clip 38 contacts the end wall of the groove 40 resulting in extension and endless loop power transmission member take-up.

A check valve 16 can be located between the cylinder 50 and piston 14. A piston spring 18 can be located between the cylinder 50 and piston 14. An optional flow control device 20 can be located between the cylinder 50 and piston 14. The check valve 16, piston spring 18, and optional flow control device 20 can cooperate to create hydraulic tensioner functions.

The timing drive extending piston chain take up tensioner uses a piston 14 sliding inside of a bore 52. The tensioner bore 52 contains the check valve 16. Between the piston 14 and check valve 16 are a piston spring 18, and an optional flow control device 20 creating conventional hydraulic tensioner function. The piston 14 has a plunger 12 riding inside of a bore 34. The piston 14 also has a ball bearing 28 captured in a counter bore 32 having a taper 36. Between the bearing 28 and plunger 12 is a bias spring 42 that energizes the bearing 28 as well as extends the plunger 12. The plunger 12 is able to extend but is locked by the bearing 28 in the retracting direction. A circular clip 38 is retained within a groove in the inside diameter (ID) of the bore 52. The circular clip 38 rides within a groove 40 of given width formed on the outside diameter (OD) of the piston 14. The width corresponds to the allowable backlash for the tensioner 10. When the circular clip 38 contacts an end wall of the groove 40 during extension the piston 14 stops. The plunger 12 being biased out by the spring 42 will extend to maintain timing system arm contact resulting in chain slack take-up.

The timing drive extending piston chain take up tensioner uses an expanding piston 14 designed to take up chain slack allowing for the tensioner 10 to maintain a mean position maintaining constant tensioner tune over the life of the timing drive. The plunger/piston assembly 12/14 may only expand when the hydraulic piston 14 has reached a full stroke position. The movement is controlled by a one way device and is unable to retract, thereby taking up chain slack. This function is accomplished using a plunger 12 guided within a bore 34 in the piston 14. The plunger 12 passes through a ball bearing 28 captured in a counter bore 32 with a tapered wall 36. A spring 42 biases the plunger 12 out allowing the plunger 12 to extend passing through the bearing 28. The piston 14 is retained by a clip 38 riding in a groove 40 of desired backlash width. The piston 14 rides within a tensioner bore 52. The bore 52 houses the oil feed 54, check valve 16, piston spring 18, and any flow control device 20, if desired.

The plunger 12, piston 14, bearing 28, and bias spring 42 form the chain slack take-up mechanism. The spring 42 biases the plunger 12 out allowing the plunger 12 to extend passing through the bearing 28. In the retracting direction, the ball bearing 28 is driven back into the tapered bore 36 locking the plunger 12 and preventing the plunger 12 from retracting. The piston 14 is retained by a clip 38 riding in a groove 40 of desired backlash width. When the piston 14 extends such that the clip 38 hits the end of the groove 40, the piston 14 stops and the plunger 12 is allowed to extend. Refraction is not possible so chain slack take-up occurs. Since the plunger 12 performs the chain slack take up, the tensioner tune does not change over the life of the chain.

Standard hydraulic tensioner function is supplied by the check valve 16, piston spring 18, and flow control device 20. A conventional ratchet can be used to control chain take-up, but pitch must be kept as small as possible.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tensioner (10) for an endless loop power transmission member comprising:
    a plunger (12) operably engageable with an endless loop power transmission member;
    a piston (14) guiding the plunger (12) for sliding coaxial movement in a direction of the endless loop power transmission member and defining an oil reservoir (26) for receiving hydraulic fluid; and
    a bearing (28) having bearing balls (30) located in a counter bore (32) coaxial with piston bore (34), the counter bore (32) having a steep taper (36) on which the bearing balls (30) ride, such that as the plunger (12) moves in an extending direction, the bearing balls (30) move out of the counter bore (32) allowing free extending movement of the plunger (12), and such that as the plunger (12) moves in a retracting direction, the bearing balls (30) are driven down into the steep taper (36) preventing the plunger (12) from retracting.

2. The tensioner (10) of claim 1 further comprising:
    a cylinder (50) having a bore (52) for guiding the piston (14) for sliding coaxial movement in a direction of the endless loop power transmission member and defining an oil reservoir (26) for receiving hydraulic fluid therebetween; and
    a circular clip (38) retained within a groove in an inside diameter (ID) of the cylinder (50).

3. The tensioner (10) of claim 2 further comprising:
    the piston (14) having a groove (40) of given width on the piston (14) in which the circular clip (38) rides, the given width corresponding to an allowable backlash for the tensioner (10).

4. The tensioner (10) of claim 3 further comprising:
    an end wall of the groove (40) coming into contact with the circular clip (38) during extending movement, such that the circular clip (38) stops the piston (14) with the circular clip (38).

5. The tensioner (10) of claim 4 further comprising:
    a bias spring (42) acting between the bearing (28) and plunger (12), the bias spring (42) serving to bias the plunger (12) out of the piston (14) when the circular clip (38) contacts the end wall of the groove (40) resulting in extension and endless loop power transmission member take-up.

6. The tensioner (10) of claim 1 further comprising:
    a cylinder (50) having a bore (52) for guiding the piston (14) for sliding coaxial movement in a direction of the endless loop power transmission member and defining an oil reservoir (26) for receiving hydraulic fluid therebetween; and
    a check valve (16) located between the cylinder (50) and piston (14).

7. The tensioner (10) of claim 6 further comprising:
a piston spring (18) located between the cylinder (50) and piston (14); and
a bias spring (42) acting between the bearing (28) and plunger (12) located in series with the piston spring (18), wherein the piston spring (18) provides a higher force so that the plunger (12) only extends when the hydraulic tensioner (10) is fully extended, guaranteeing that a minimum backlash is maintained in the tensioner (10).

8. The tensioner (10) of claim 7 further comprising:
a flow control device (20) creating hydraulic tensioner functions.

9. A tensioner (10) for an endless loop power transmission member comprising:
a plunger (12) operably engageable with an endless loop power transmission member;
a piston (14) guiding the plunger (12) for sliding coaxial movement in a direction of the endless loop power transmission member and defining an oil reservoir (26) for receiving hydraulic fluid;
a bearing (28) having bearing balls (30) located in a counter bore (32) coaxial with piston bore (34), the counter bore (32) having a steep taper (36) on which the bearing balls (30) ride, such that as the plunger (12) moves in an extending direction, the bearing balls (30) move out of the counter bore (32) allowing free extending movement of the plunger (12), and such that as the plunger (12) moves in a retracting direction, the bearing balls (30) are driven down into the steep taper (36) preventing the plunger (12) from retracting; and
a bias spring (42) acting between the bearing (28) and plunger (12), the biasing spring (42) serving to bias the plunger (12) out of the piston (14) resulting in extension and endless loop power transmission member take-up.

10. The tensioner (10) of claim 9 further comprising:
a cylinder (50) having a bore (52) for guiding the piston (14) for sliding coaxial movement in a direction of the endless loop power transmission member and defining an oil reservoir (26) for receiving hydraulic fluid therebetween; and
a circular clip (38) retained within a groove in an inside diameter (ID) of the cylinder (50).

11. The tensioner (10) of claim 10 further comprising:
the piston (14) having a groove (40) of given width on the piston (14) in which the circular clip (38) rides, the given width corresponding to an allowable backlash for the tensioner (10).

12. The tensioner (10) of claim 11 further comprising:
an end wall of the groove (40) coming into contact with the circular clip (38) during extending movement, such that the circular clip (38) stops the piston (14) with the circular clip (38).

13. The tensioner (10) of claim 9 further comprising:
a cylinder (50) having a bore (52) for guiding the piston (14) for sliding coaxial movement in a direction of the endless loop power transmission member and defining an oil reservoir (26) for receiving hydraulic fluid therebetween; and
a check valve (16) located between the cylinder (50) and piston (14).

14. The tensioner (10) of claim 13 further comprising:
a piston spring (18) located between the cylinder (50) and piston (14); and
a bias spring (42) acting between the bearing (28) and plunger (12) located in series with the piston spring (18), wherein the piston spring (18) provides a higher force so that the plunger (12) only extends when the hydraulic tensioner (10) is fully extended, guaranteeing that a minimum backlash is maintained in the tensioner (10).

15. The tensioner (10) of claim 14 further comprising:
a flow control device (20) creating hydraulic tensioner functions.

\* \* \* \* \*